United States Patent [19]

Ekman

[11] Patent Number: 4,865,292

[45] Date of Patent: Sep. 12, 1989

[54] FEMALE COUPLING COMPONENT FOR A QUICK COUPLING

[76] Inventor: Kjell R. Ekman, Aberenrain 43, CH-6340 Baar, Switzerland

[21] Appl. No.: 11,080

[22] Filed: Feb. 5, 1987

[30] Foreign Application Priority Data

Feb. 5, 1986 [SE] Sweden ................. 8600512

[51] Int. Cl.$^4$ ............................. F16L 29/00
[52] U.S. Cl. .................... 251/149.6; 285/316
[58] Field of Search ............. 285/316; 251/149.6

[56] References Cited

U.S. PATENT DOCUMENTS

| Re. 23,120 | 6/1949 | Earle et al. | 285/316 X |
| 3,195,935 | 7/1965 | Beebee. | |
| 4,582,347 | 4/1986 | Wilcox et al. | 285/316 X |
| 4,592,387 | 6/1986 | Rogers. | |

FOREIGN PATENT DOCUMENTS

| 0122404 | 2/1984 | European Pat. Off. . | |
| 631740 | 11/1978 | U.S.S.R. | 285/316 |
| 2068069 | 1/1980 | United Kingdom . | |

Primary Examiner—Dave W. Arola
Attorney, Agent, or Firm—Pollock, Vande Sande & Priddy

[57] ABSTRACT

A female coupling component interacts with a male coupling component in a quick coupling. The female coupling component contains a centrally extending device and a sealing sleeve longitudinally displaceable relative to the device. The female coupling component contains a sleeve-shaped bearing component which constitutes a separate part on assembly. The bearing component supports the and the sealing sleeve. Support for the device is provided via radially extending elements (12). The bearing component carries a load-relieving device (13b) which is capable of interacting with the sealing sleeve, so that any forces (F) which occur inside the sealing sleeve are absorbed by the bearing component. The elements include a disc-shaped unit which extends diametrically in the recess for the bearing component. The unit exhibits a threaded bearing hole, in which the centrally extending device can be secured by means of a threaded end journal.

9 Claims, 1 Drawing Sheet

FEMALE COUPLING COMPONENT FOR A QUICK COUPLING

BACKGROUND OF THE INVENTION

1. Technical Field

The present invention relates to a structure of a female coupling component which is included in a quick coupling. The female coupling component contains a centrally extending component and a sealing sleeve capable of longitudinal displacement with respect to this component. Quick couplings designed for low or high pressure may be mentioned as examples.

2. Description of the Prior Art

A large number of quick couplings are known and used in various applications. Such devices may be included as a valve body in a quick coupling. If the quick coupling is to be used in a vulnerable environment, it may incorporate a so-called protective cover to prevent impurities and foreign particles from entering into the coupling. Couplings of this kind can also incorporate a holder for balls or similar as a part of a locking device for the male and female components of the quick coupling.

SUMMARY OF THE PRESENT INVENTION

In the case of the type of quick coupling mentioned above, the need exists in various respects to be able to achieve a construction which affords flexibility in the production and assembly of the quick coupling as part of a rational manufacturing process. The construction shall be capable for this purpose of being so executed as to consist of easily interchangeable components which can be combined together to meet various standards with regard to, for example, thread dimensions and thread types.

The quick coupling shall also exhibit a design whereby the quick coupling functions can take place in an optimal fashion, with low connection forces and absence of leakage on changing over, etc.

The object of the present invention is to propose, amongst other things, a design of female coupling component which allows to eliminate the indicated problems. The above new female coupling component of the present invention includes a sleeve-shaped bearing component for the centrally extending device and the sealing sleeve is accommodated in a recess intended for that purpose in the female coupling component. The device is supported in the bearing component through radially extending elements, by means of which one or more fluid passageways are formed between the outside of the device and the inside of the bearing component, and that the bearing component carries a load-relieving device for any fluid forces which act on the sealing sleeve as part of the function of the quick coupling.

In one embodiment of the present invention two elements for supporting the centrally extending device shall be executed with the help of a disc-shaped unit which extends diametrically in the fluid passageway of the bearing component. The unit should preferably exhibit an anchoring recess for the centrally extending device, which can be provided with a threaded end part via which the device can be screwed into in a corresponding recess of the unit. In order for the centrally extending device to exhibit a rigid attachment, the threaded end part is provided with radially extending supporting surfaces which interact with corresponding surfaces on the end edge of the unit.

The unit can be provided with limited penetration in the longitudinal direction of the female coupling component and yet is still capable of providing its securing function for the centrally extending device. The unit serves in a preferred embodiment as an end stop for the degree of insertion of the sealing sleeve into the female coupling component. In order to achieve a suitable sealing function in the quick coupling, it is essential for the sealing sleeve to be allocated a pre-determined degree of insertion into the female coupling component. This degree of insertion can be determined by means of the devices which support the end stops of the unit, and may be in the form of one or more pins extending from the unit. Such pins would extend from the unit in the longitudinal sense of the female coupling component.

In one embodiment the elements are securely supported in the longitudinal direction of the female coupling component. The support is provided at one end of the bearing component, and the sealing sleeve is supported in and works inside the other parts of the bearing component. The sealing sleeve projects outwards through the other end of the bearing component so as to interact with devices in the male coupling components on connecting together the male and female components of the quick coupling.

In the event of the female coupling component incorporating holders for locking balls, the bearing component should preferably be supported in a similar holder. The sealing sleeve is able in this way to interact with a first return spring which is in contact with the aforementioned element, and the bearing component constitutes a support for a second return spring for a protective cover which may be arranged in the female coupling components.

The load-relieving devices consist essentially of inward-projecting devices, preferably arranged at the free end of the bearing component. Corresponding load-relieving devices on the sealing sleeve can have the form of corresponding projecting devices situated on those parts of the sealing sleeve which are situated inside the bearing components.

The bearing component is capable of being accommodated in a recess in the female coupling component and secured with the help of an internal recess in the ball race when this is assembled with a body component or corresponding component of the female component. The sealing sleeve and the radial elements (the unit) are so arranged in relation to the anchoring component as to be capable of being accommodated before the anchoring component is accommodated inside the recess.

The embodiments indicated above provide advantages, especially in conjunction with the manufacture and assembly of quick coupling components. These can be executed with different threads which are suitable for use in their respective areas of application. The essential functions and properties of quick couplings of this kind can be retained in spite of the fact that the first-named functions are additional.

A preferred embodiment of a female coupling component which exhibits the significant characteristics of the invention is described below with reference to the accompanying drawings, in which:

THE PREFERRED EMBODIMENT AND THE BEST MODE OF CARRYING OUT THE INVENTION

Figure 1:
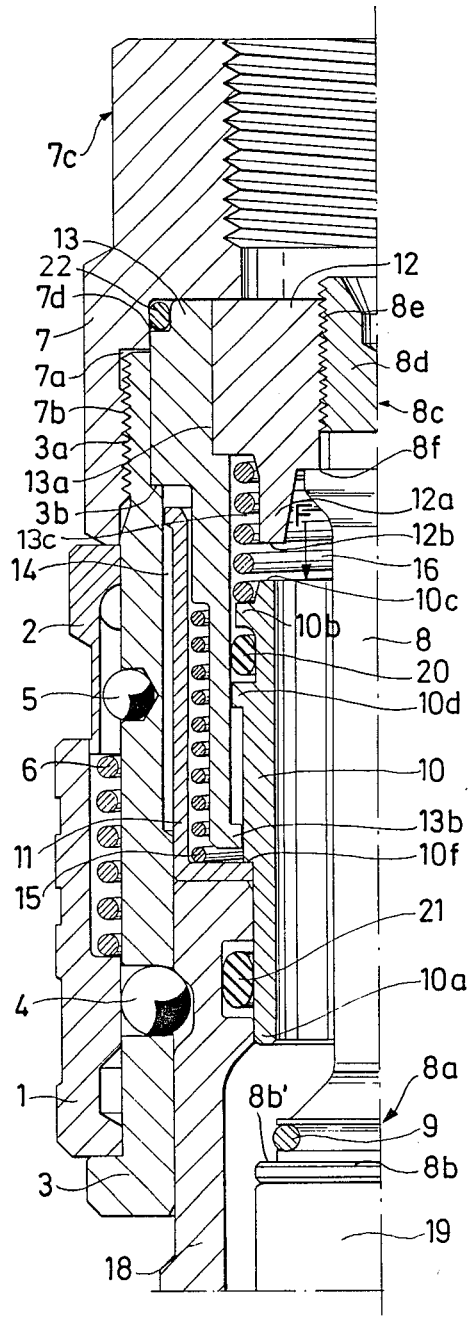
FIG. 1 shows a preferred embodiment of the female coupling component according to the present invention in a cross section through one half of the coupling and with parts of the male coupling component projecting into the female coupling component, indicating the connected position for the male and female components of the quick coupling component.

FIG. 1 shows a quick coupling with previously disclosed locking devices which contain a locking sleeve 1 and a retaining sleeve 2. The locking device also contain a ball race 3, with the locking balls which are capable of interacting with the sleeve 1 indicated by 4. The balls in the ball race which are capable of interacting with the locking sleeve 2 are indicated by 5. A spring between the sleeves 1 and 2 is indicated by 6. The ball race is provided with a thread 3a which is capable of being screwed together with a body part or nut part 7 which is provided with an internal recess 7a and an internal thread 7b arranged . The internal thread matches the thread 3a of the ball race. At its free end the component 7 has a nut-shaped projection 7c.

The quick-coupling described here contains a centrally arranged valve body 8 which, at its one end 8a, exhibits a sealing component 8b. The sealing component supports a sealing ring 9. The female coupling component also contains a sealing sleeve 10 capable of longitudinal displacement which, at its first end 10a, is capable of interacting with the sealing ring 9.

In the embodiment shown the female coupling component is also provided with a so-called protective cover 11 which is so arranged in the female coupling component as to be capable of longitudinal displacement.

The valve body 8 is supported at its other end 8c in the female coupling component by disc-shaped elements 12. The elements are supported in turn in a bearing component 13 which constitutes a separate part of the female coupling component and which is secured in position in the female coupling component the ball race 3. The ball race includes a recess 3b for the bearing component, and the component 7 has a recess 7d for the bearing component. The bearing component has a recess 13a for the elements 12.

The bearing component 13 is stepped down away from the threads 3a and 3b so that a gap 14 is formed between the inner surface of the ball race and the outer surface of the bearing component. The protective cover 11 extends into this gap, and also arranged in the gap is a return spring 15 for the protective cover.

The sealing sleeve 10 is arranged in the bearing component 13 in such a way that it projects partially into and works (is displaced longitudinally) in the bearing component. The unit 12 consititutes a support for a return spring 16 for the sealing sleeve which exhibits a projecting flange 10b for the spring.

The unit is provided with stop devices 12a for the sealing sleeve 10 extending inside the spring 16, the degree of insertion of the sleeve into the female coupling component being is thus defined. Those surfaces of the sleeve 10 and the unit 12 which are capable of interacting with one another are indicated by 10c and 12b respectively.

The bearing component exhibits an inward-projecting flange 13b which is capable of interacting with a corresponding outwardly projecting flange 10d on the sleeve 10. The flange 13b is arranged at the free end of the bearing component, and the flange 10d is arranged at the central part of one half (the inner half) of the sleeve. The flanges 10d and 13b restrict the degree of projection of the sleeve 10 from the bearing component, at the same time they absorb any fluid forces F acting on the sealing sleeve. The force F can occur with the female component in a position in which it is not connected to the male component. The possibility of high pressures may thus arise as a consequence of for example shocks in the fluid. Forces F caused by a working pressure of up to about 50 MPa, for example, can thus occur. In the unconnected position the sealing sleeve rests against the projecting part 8b of the device 8. Any stresses acting on the device 8 can be restricted in this way with the help of the relief function 10d and 13b.

The sealing sleeve also includes a shoulder 10f, by which the sleeve is actuated by the protective sleeve 11 in the manner described below.

Figure 2:
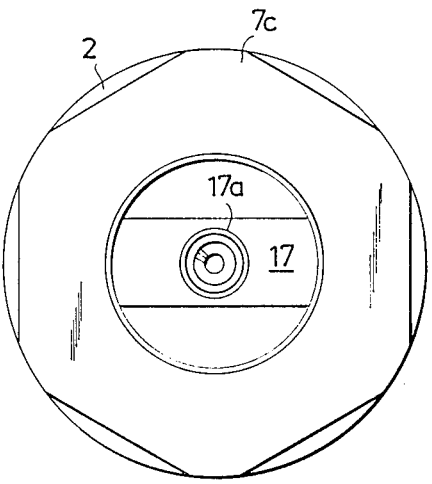
FIG. 2 shows a horizontal view of the coupling in accordance with FIG. 1 seen from one of its ends.

The element 12 forms part of a disc-shaped unit 17 which extends diametrically over the recess 13c in the bearing component 13 (see FIG. 2). The unit is provided with a bearing recess 17a, preferably a threaded bearing housing. The device 8 is capable of being secured in the unit via an end part 8d, which in this particular case has a thread 8e which matches the threaded hole 17a. In order to ensure the rigid attachment of the device 8 in the unit 17, the device is provided with a radial surface 8f which interacts with a corresponding radial surface on the unit.

During the connecting procedure, the sealing sleeve 10 and the unit 17, for example, can first be positioned in the bearing component 13 which is separate at the time of assembly. The latter in turn may be positioned in the ball race 3, whereupon the entire assembly is screwed securely to the component 7 through the threads 3a, 7b. Once they have been securely screwed together in this way, the bearing component 13 and the unit 17 are secured against longitudinal displacement in the female coupling component.

FIG. 1 shows the female coupling component in a position in which it is connected with a male coupling component 18. At the time of being connected, the latter will have caused the protective sleeve 3 to be displaced longitudinally inwards against the effect of the spring 15. The protective sleeve in turn will have caused the sealing sleeve to be displaced inwards against the effect of the spring 16. The stop surfaces 10c and 12b limit the degree of insertion of the sleeve if the sleeve is incorrectly caused to move further inwardly by the male component 18.

The fluid passageway extends to either side of the elements 12, between the inner surface of the bearing component 13 and the outside of the device 8, through the inside of the sealing sleeve, and between the inner surface of the male component 18 and the outside of the component 8b. The fluid passageway leads on into the male component on the outside of the valve body 19 of the latter, which, at the time of connection, is capable of interacting with the component 8b in the female component.

The fluid is sealed with the help of a first seal 10 (with an associated so-called back-up ring) between the flanges 10b and 10d on the sealing sleeve and a second sealing 21 (similarly with a so-called back-up ring) on the inside of the male component. It will be appreciated that leakage could occur at the seal 20 if the degree of insertion of the sealing sleeve were not to be restricted by the stop surfaces 10c, 12b. A seal 22 is arranged on the outside of the bearing component, in the recess 7d.

When the female and male components are disconnected in a previously disclosed fashion, the sealing sleeve 10 is returned by its return spring 16, 15. The sealing sleeve enters into interaction with the seal 9 and comes up against a flange surface 8b' situated on the component 8b. The outside of the protective sleeve 11 constitutes together with the outer surface of the component 8b a common, essentially flat end surface on the female coupling component.

The unit is so executed that the respective elements in the section shown in FIG. 1 exhibit essentially rectangular form, in which the long side exceeds the short side by a good margin and is, for example, approximately twice as long. The rectangle-shaped cross-section is transformed at the bottom into an irregular pentagon which constitutes the stop device 12a. The unit 17 adopts a position in the bearing component which means that its outer parts which are supported in the bearing component exhibit substantially the same external dimensions as the sealing sleeve. The half of the coupling which is not illustrated here is of similar design to that shown.

It will be appreciated that the unit 17 can be supported in such a way as to be capable of longitudinal displacement in the bearing component 13, and/or that the device 8 can be displaced upwards and can be provided with a sealing component corresponding to the sealing component 8b. It is possible in this way, for example, to achieve a two-valve assembly so arranged as to be capable of longitudinal displacement in the female component, which assembly may be of interest in the case of extremely high pressure inside the coupling component. The disc-shaped unit can be produced from a flat steel blank.

The invention is not restricted to the embodiment illustrated above by way of example, but may undergo modifications within the scope of the following Patent Claims or the idea of invention.

I claim:

1. A female coupling component included in a quick coupling unit comprising:
    a cylindrical outer portion including an inner cylindrical support member connected to said cylindrical outer portion and insertable over a male component of the quick coupling unit, said inner cylindrical support member having an inner wall and including a recess in said inner wall thereof, said outer portion forming a longitudinal bore extending therethrough;
    a sleeve-shaped bearing component supported in said recess formed in said inner wall of said inner support member and extending substantially within said inner support member, said bearing component including an inner wall having a recess therein;
    a valve device centrally disposed within said longitudinal bore and having a lower end, a top portion and an exterior surface, said top portion being connected to a wing-like member including wing-like elements radially extending across said bore between said bearing component and said valve device, said disc-like member being supported along an outer periphery thereof in said recess formed in said inner wall of said bearing component; and
    a sealing sleeve extending in said longitudinal bore below said wing-like element, between said inner wall of said bearing component and said exterior surface of said valve device, means sealingly engaging said inner wall of said bearing component and said sealing sleeve, said sealing sleeve being longitudinally displaceable with respect to said valve device between a connected and disconnected state of said female and said male components;
    at least one fluid passageway formed along said wing-like elements and inside said sealing sleeve and extending into said male component;
    means for moving said sealing sleeve to close said fluid passageway;
    wherein said valve device at said lower end is provided with a bearing element supporting a seal and cooperating with a lower end of said sealing sleeve to sealingly close said fluid passageway in a disconnected state of said female and male components; and wherein during connection of the male and female components, said male component sealingly engages said sealing sleeve and said sealing sleeve is moved away from said seal to open said fluid passageway;
    wherein said bearing component and said sealing sleeve include load relieving means cooperating with each other for absorbing fluid forces acting on said sealing sleeve during said disconnected state of said female and male components.

2. A female coupling component according to claim 1 wherein said wing-shaped member includes connecting means for interconnection with a corresponding connecting means on said valve device.

3. A female coupling component according to claim 2 wherein said connecting means on said valve device includes a threaded end part and at least one radially extending surface adjacent to said threaded end part, said surface interacting with a corresponding supporting surface constituting part of said connecting means on said unit.

4. A female coupling component according to claim 3 wherein at least one of said wing-like elements includes stop portions extending towards said sealing sleeve to cooperate with top portion of said longitudinally displaceable sealing sleeve.

5. A female coupling component according to claim 4 wherein said support member for supporting said bearing component (13) is a ball race (3) for locking balls (4) contained in the female coupling component outer position.

6. A female coupling component according to claim 5 wherein said means for moving said sealing sleeve to close said fluid passageway comprises a first return spring which is located in said bore between a bottom part of said wing-like element and said top part of said sealing sleeve to interact between said element and said sleeve and a second return spring positioned in a space between said ball race and bearing component and a protective cover is arranged in said space outside said second return spring.

7. A female coupling component according to claim 6 wherein said load-relieving means on said bearing component includes a flange member inwardly extending along a circumference of the lower end of said bearing component, said flange on said bearing component cooperating with an outwardly projecting flange on said sealing sleeve substantially in a central part of said sealing sleeve outer wall.

8. A female coupling component according to claim 1 wherein said wing-shaped elements (12) include end stop portion extending towards said sealing sleeve to cooperate with a top portion of said longitudinally displaceable sealing sleeve.

9. A female coupling according to claim 1 wherein said support member for supporting said bearing component is a ball race for locking balls contained in the female coupling component.

* * * * *